(12) United States Patent
Sandlofer

(10) Patent No.: US 9,473,190 B1
(45) Date of Patent: *Oct. 18, 2016

(54) PHONE CASE WITH BUILT-IN HOLDER

(71) Applicant: Jason Sandlofer, Jersey City, NJ (US)

(72) Inventor: Jason Sandlofer, Jersey City, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/812,058

(22) Filed: Jul. 29, 2015

Related U.S. Application Data

(60) Provisional application No. 62/129,203, filed on Mar. 6, 2015.

(51) Int. Cl.
*G03B 17/56* (2006.01)
*H04B 1/3888* (2015.01)

(52) U.S. Cl.
CPC ........... *H04B 1/3888* (2013.01); *G03B 17/563* (2013.01)

(58) Field of Classification Search
CPC ........ H04B 3/46; H04B 15/00; F16M 13/00; H04N 5/23219
IPC ..... H04M 1/0264, 1/04, 1/0249, 1/0252; H04B 1/3888, 1/3887; G03B 17/56
See application file for complete search history.

(56) References Cited

U.S. PATENT DOCUMENTS

| | | | |
|---|---|---|---|
| 7,301,759 B2 | 11/2007 | Hsiung | |
| 8,490,789 B2 | 7/2013 | Lach et al. | |
| 8,915,660 B1 * | 12/2014 | Ben Yehuda | F16M 11/041 396/420 |
| 9,301,584 B2 * | 4/2016 | Butts | A45C 11/00 |
| 2011/0299231 A1 | 12/2011 | Gaddis, II et al. | |
| 2013/0005401 A1 | 1/2013 | Rosenhan et al. | |
| 2013/0293731 A1 * | 11/2013 | Kim | H04N 5/2251 348/211.2 |
| 2014/0124521 A1 | 5/2014 | Brown | |
| 2014/0146193 A1 | 5/2014 | Yang et al. | |
| 2016/0070156 A1 * | 3/2016 | Alster | G03B 17/563 396/424 |

FOREIGN PATENT DOCUMENTS

| | | |
|---|---|---|
| CN | 202872880 U | 4/2013 |
| CN | 203039751 U | 7/2013 |
| WO | 2013191314 A1 | 12/2013 |

OTHER PUBLICATIONS

MakerBot, Stand for mobile case, http/youtu.be/wTo8Ra4, the date of publication unknown—admitted prior art.
Techheroes, "Stabil-i Case could be the simplest video camera stabilizer yet", www.gizmag.com/iphone-stabil-i-case-stabilaizer, Jul. 30, 2012.

(Continued)

*Primary Examiner* — Cindy Trandai
(74) *Attorney, Agent, or Firm* — Gottlieb, Rackman & Reisman, P.C.

(57) ABSTRACT

A case for an electronic device such as a smart phone includes a handle with a trigger element. The handle is selectively rotatable from a closed position in which the handle is disposed adjacent to the case and an active position in which the electronic device is positioned and oriented to take a picture in a predetermined direction (for example for taking a "selfie.") The handle preferably includes several telescoping sections to extend the effective length of the handle.

13 Claims, 9 Drawing Sheets

(56) References Cited

OTHER PUBLICATIONS

I-BLASON, Slim Case for iPhone, www.amazon.com/i-bloson-Trasformer-Holster-Kikstand, Jan. 20, 2015.

HOOTCOOL, Slim Hard Shell Holster, www.amazon.com/HOOTCOOL-Phone-Case-Kickstand-Smart, Jan. 20, 2015.

Ergotech Products, iPad Desk Stand, www.ergodirect.comlproduct_info.php, Jan. 20, 2015.

* cited by examiner

PHONE CASE WITH BUILT-IN HOLDER

RELATED APPLICATIONS

This application claims priority to U.S. Provisional Patent application Ser. No. 62/129,203 filed on Mar. 6, 2015 and incorporated herein in its entirety.

BACKGROUND OF THE INVENTION a. Field of Invention

This application pertains to a case for an electronic portable device, such as a smart phone, tablet or video recorder and the like that has an integral handle. The handle can be selectively extended to allow a person to hold the portable electronic device while taking pictures.

b. Description of the Prior Art

Many portable electronic devices, such as smart phones, music players, and the like, have a built in camera that can be used to take still and moving images. Early versions of these types of devices included relatively unsophisticated cameras and images obtained from these cameras were not very high quality. Moreover their optical characteristics were limited so that they could not be used to take close-up pictures.

However recent advances in these cameras lead to tremendous improvements in the quality of images that can be obtained using mobile electronic devices. Moreover, because the devices can now much better close-up pictures, taking pictures of oneself (colloquially known as a 'selfie') has become tremendously popular. Most people take such selfies by just holding the device in the palm of the hand at an arm's length. Of course, this position is rather awkward especially since the button for triggering the 'camera' is difficult to reach and activate. Alternatively, the picture must be taken using a timer. However, not all phones are equipped with timers and, since the subjects do not know when the picture is going to be taken, they make look away, close their eyes or make an undesirable phase, resulting in unacceptable images.

In addition, auxiliary devices have become available (colloquially known as "selfie sticks"), that are telescopically extendible, like an umbrella or a monopod with one end adapted to receive and hold an electronic device while taking "selfies.". However these types of auxiliary devices are still difficult to use, especially if the electronic mobile device is relatively heavy. Moreover, the auxiliary device has to be packed and carried separately and assembled and extended before each use. Alternatively, the mobile electronic device and the auxiliary arm can be carried together between the taking of images. Of course, this latter combination defeats the whole purpose of having a small, light, pocketable electronic device in the first place.

SUMMARY OF THE INVENTION

Briefly, the present invention pertains to a case for an electronic device, such a smart phone, having an internal camera for making electronic images. The case includes a body sized and shaped to form an enclosure for the electronic device; a handle having a first end and a second end; and a coupling connecting said handle at said first end with said body. Preferably, the coupling is sized and shape to fold the handle in a first position in which said handle is disposed adjacent to said body and a second position in which the handle expends away from the body to position an electronic device within the enclosure to a picture taking orientation.

In one embodiment, the case further includes a trigger member disposed at said second end and configured to selectively trigger the electronic device to take a picture.

The handle may include a sleeve and at least one section telescopically extendable from the sleeve to increase the effective length of the handle.

In one embodiment, the handle also includes a center portion a first element with a first end. This first end is attached to said coupling, the handle further including a hinge connecting the first element to the central portion. The hinge is configured to position the central portion at a predetermined angle with respect to the body. Preferably, the body includes a back disposed in a plane and the hinge is configured to selectively pivot the central portion to said angle with respect to said plane.

In one embodiment, a case for a device, is provided, the device being configured to take selected pictures. The case includes a housing with a top a bottom and a back configured to define a cavity selectively receiving the electronic device. The case further includes a handle having a first handle end and a distal end. A coupling attaches the first handle end to the back with the handle being rotatable with respect to the housing to position the electronic device into a picture taking configuration.

The back may define a back plane and the coupling is configured to selectively position the handle to a first position in which the handle is disposed adjacent to the back and a second position by rotating said handle in a plante parallel to the back plane.

Preferably handle includes second portion connected to the first portion by a hinge, the second portion being selectively rotated to a position at an angle with respect to the back plane.

In one embodiment, the second portion includes a central portion that is hollow and a plurality of segments telescopically sliding into the central portion.

Preferably one of the segments has an outer end with a trigger element selectively activated to trigger the electronic device.

In one embodiment, the handle includes a distal end and electronic components selectively electronically connected to the electronic device. The electronic components includes a battery, an IC chip with a communication module selectively establishing wireless communication with the electronic device and a switch activated by the user to activate the electronic device.

DESCRIPTION OF THE INVENTION

Figure 1:
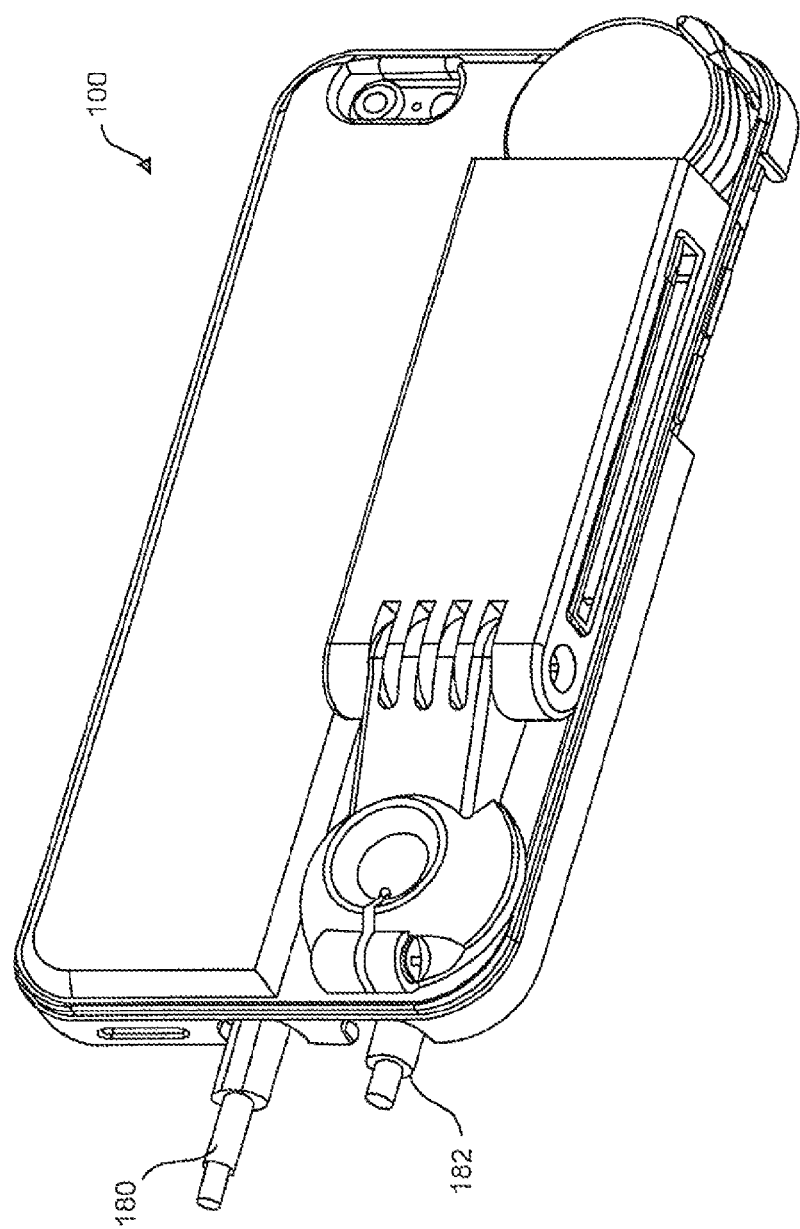
FIG. 1 shows a rear perspective view of an assembly including an electronic device inserted into a case constructed in accordance with this invention with handle being in fully retracted position.
Figure 2:
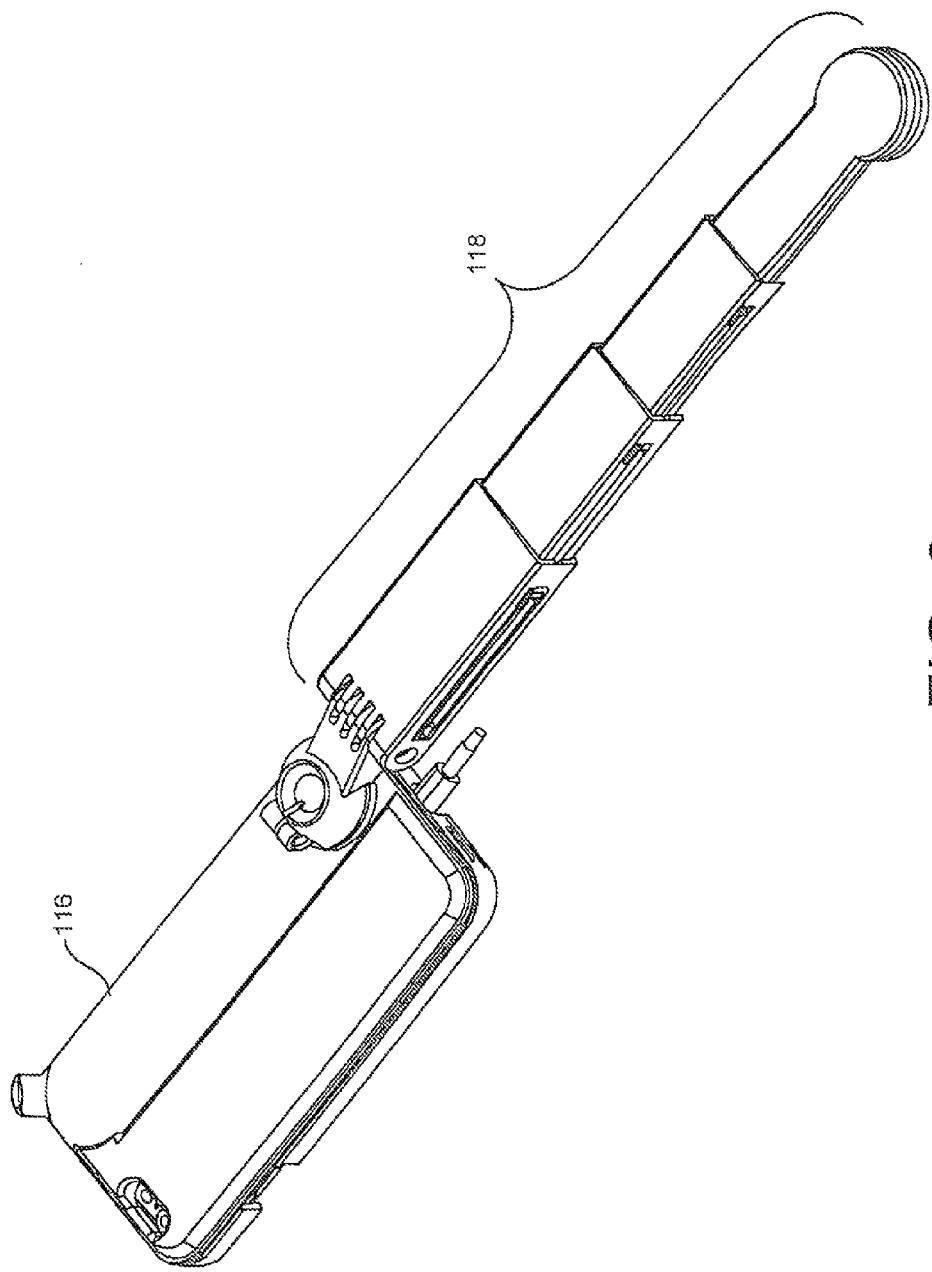
FIG. 2 shows a top perspective view of the assembly with the handle fully extended.
Figure 3:
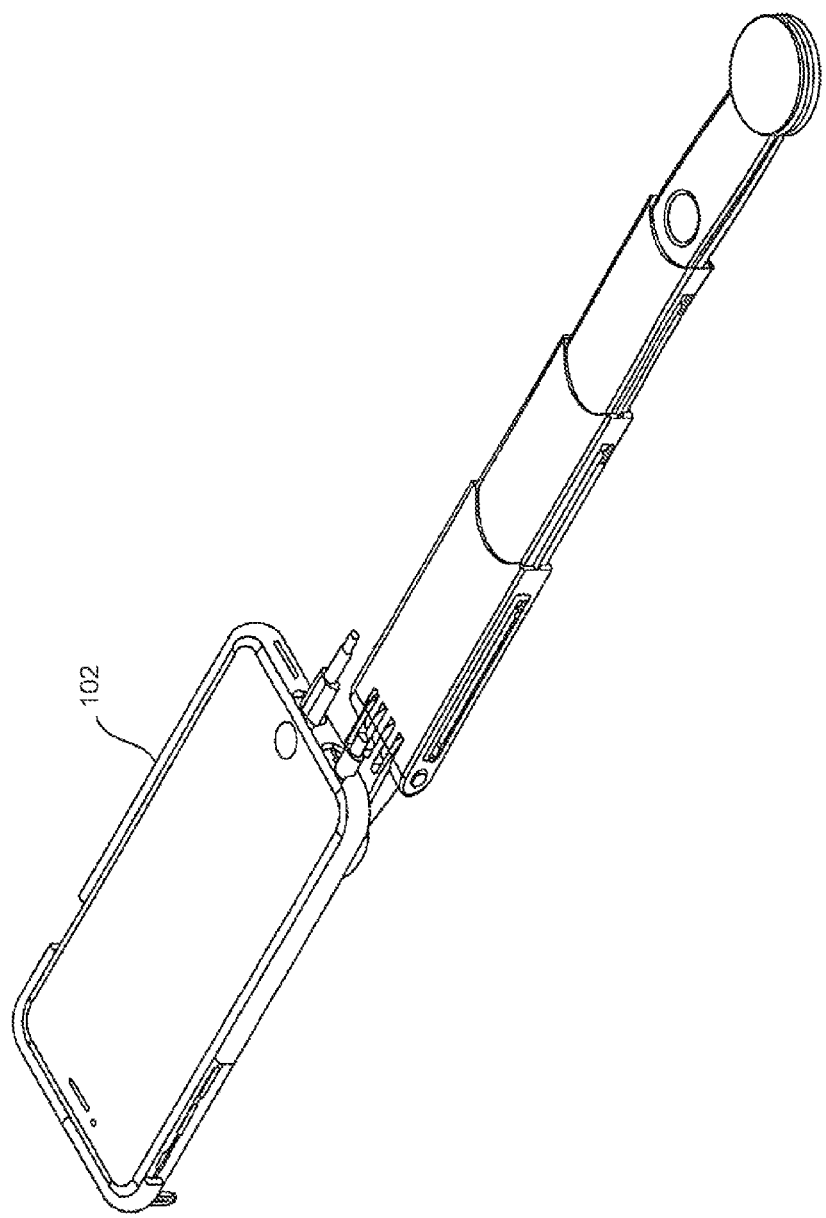
FIG. 3 shows a bottom perspective view of the assembly with the handle fully extended.
Figure 4:
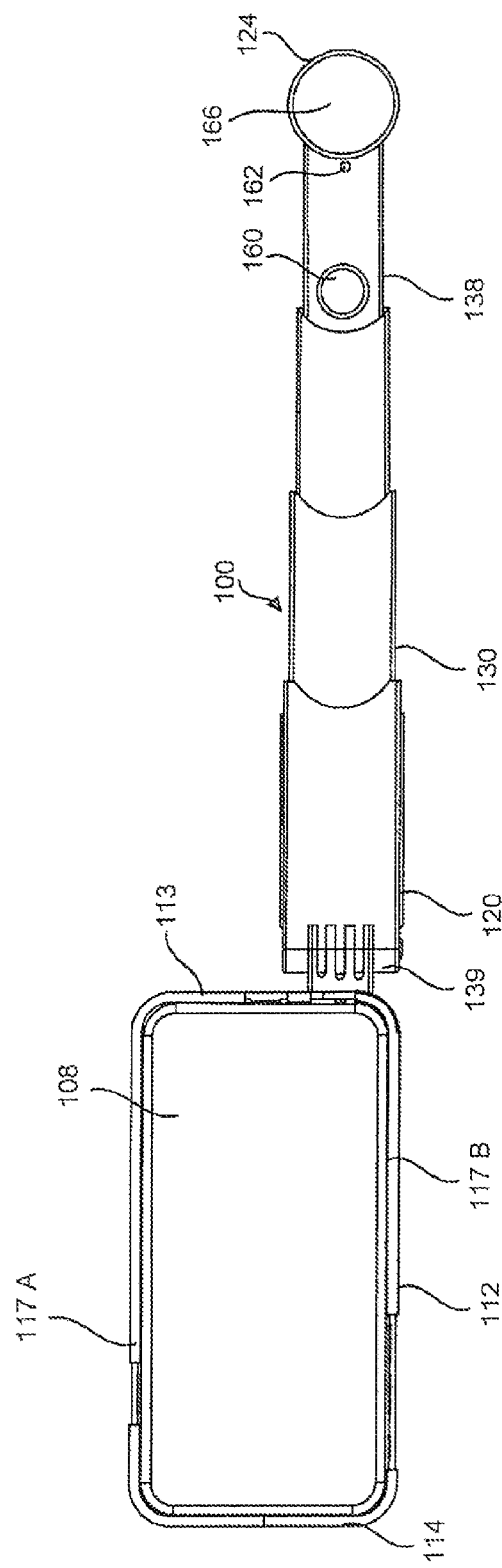
FIG. 4 shows a top view of the case with the handle fully extended.

As shown in the FIGS. 1-5, an assembly 100 constructed in accordance with this invention includes an electronic device 102 inserted into a case 110. As previously mentioned, the device 102 can be a smart phone (such as an Apple Iphone 6, or other similar electronic device that preferably may be used to take a "selfie." In FIG. 4, the electronic device has been omitted for the sake of clarity.

The case 110 includes a body 112 sized and shaped to form a cavity 108 housing the device 102. The body 112 also includes a bottom 113, a top 114 and a back 116 and sidewalls 117A. 117B. Mounted preferably on the back 116 is a rotatable and expendable handle 118. The handle 118 includes a telescoping arm 120 with a mounting end 122 and a free end 124. The mounting end 122 is arranged and constructed so that it is rotatably attached to the body 112 by a coupling such as a ball-joint 123 or other similar conventional means. This mounting end 122 allows the handle 112 to pivot in a plane parallel to the plane of the back 116 by any arbitrary angle. For example, in FIG. 1 the handle 118 is shown folded over the case body 112. In FIGS. 2-7 the handle 118 is shown as being rotated by about 180 degrees. The coupling for this motion is relatively stiff to insure that the case and the device housed therein do not flop around. The back 116 may be formed with an indentation 126 (see FIG. 6) for housing the arm 118.

Preferably, the arm 118 includes several components, such as a central sleeve 130, a first section 132 connecting the central sleeve 130 to end 122, a second section 134, a third section 136 and a fourth section 138 terminating with free end 124. The sections 134, 136 and 138 are sized, shaped and configured so that they can be selectively, extended out of or contracted into sleeve 130 as required.

Figure 5:
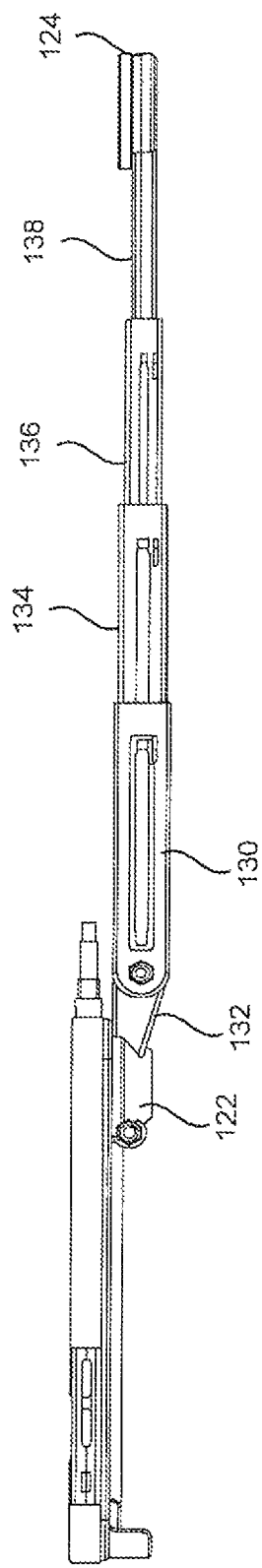
FIG. 5 shows a side view of the assembly with the handle fully extended.
Figure 6:
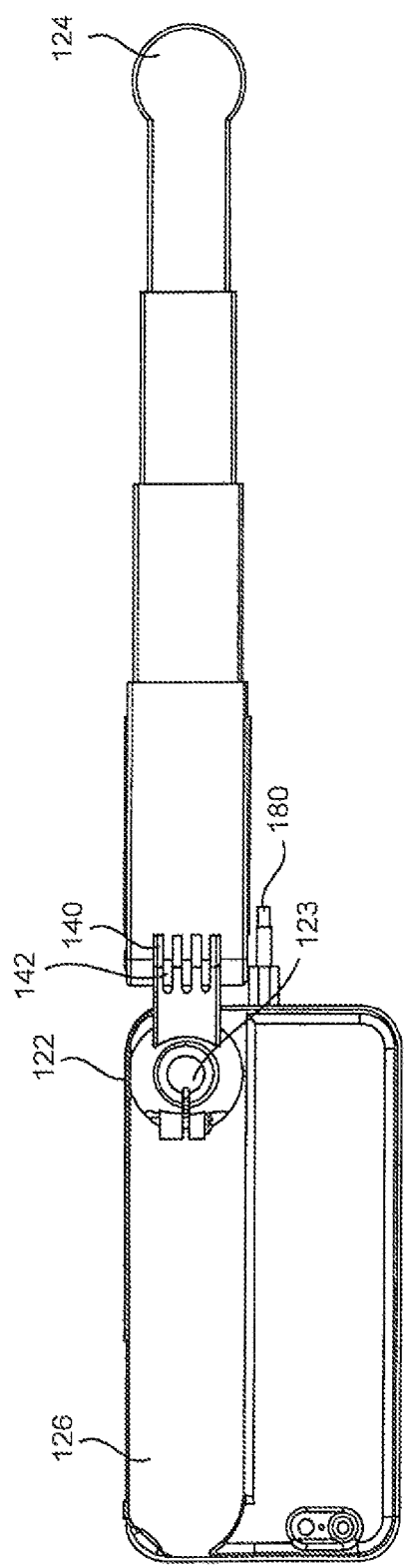
FIG. 6 shows a bottom view of the assembly with the handle fully extended.
Figure 7:
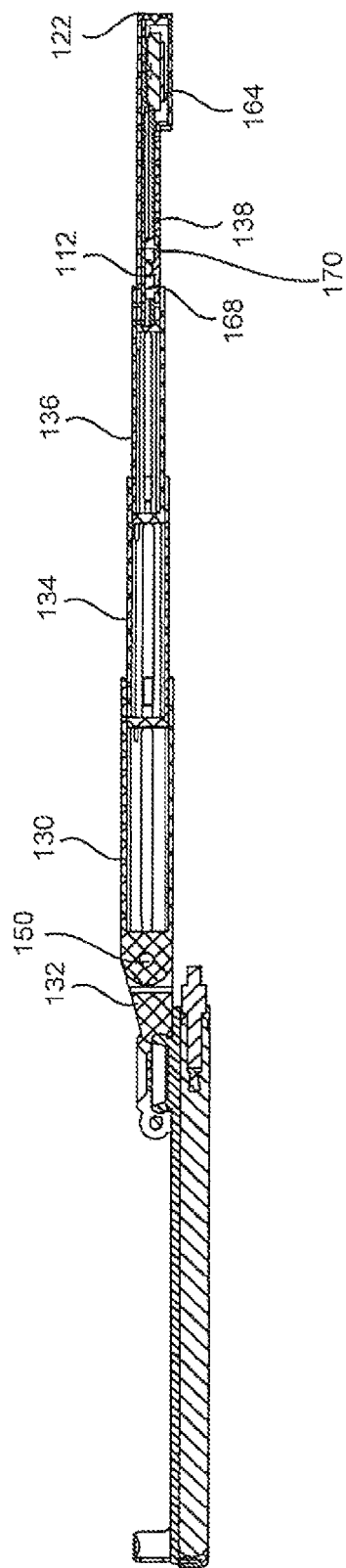
FIG. 7 shows a cross sectional view of the assembly with the handle fully extended talen along lines VII-VII in FIG. 6.
Figure 8:
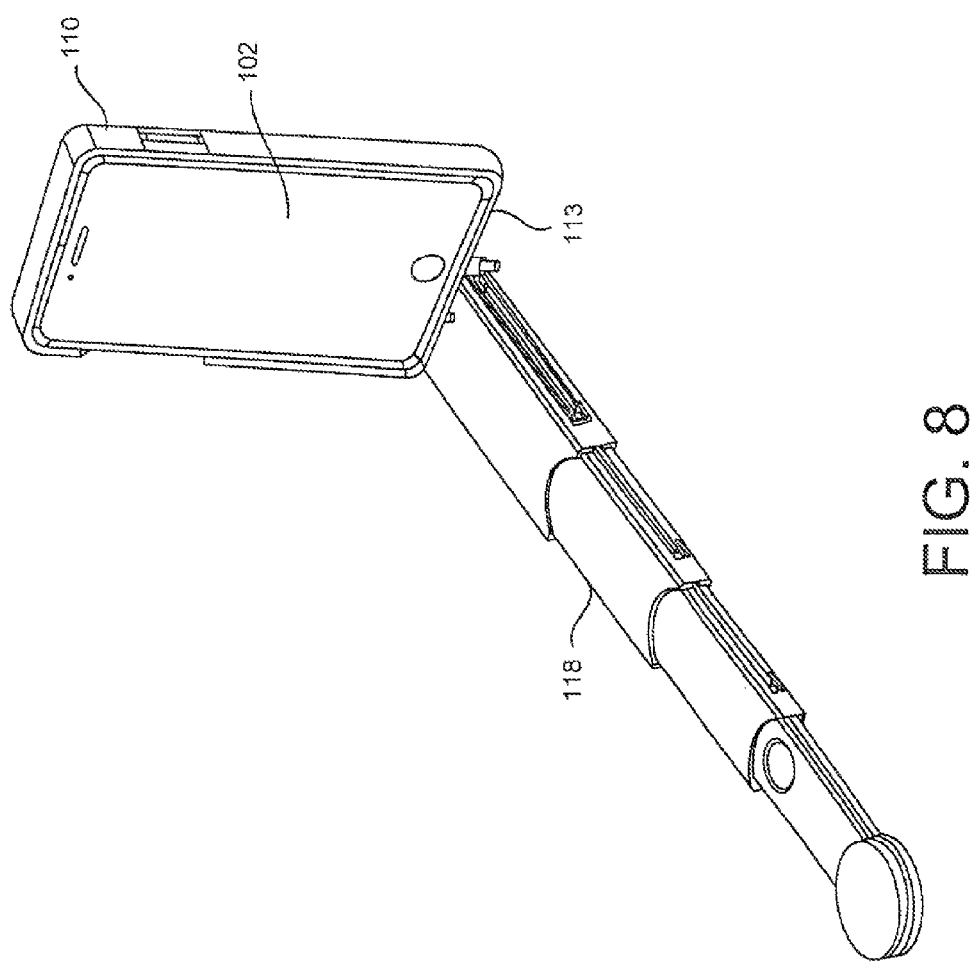
FIG. 8 shows a perspective view with the smart phone tilted to take a portrait image.
Figure 9:
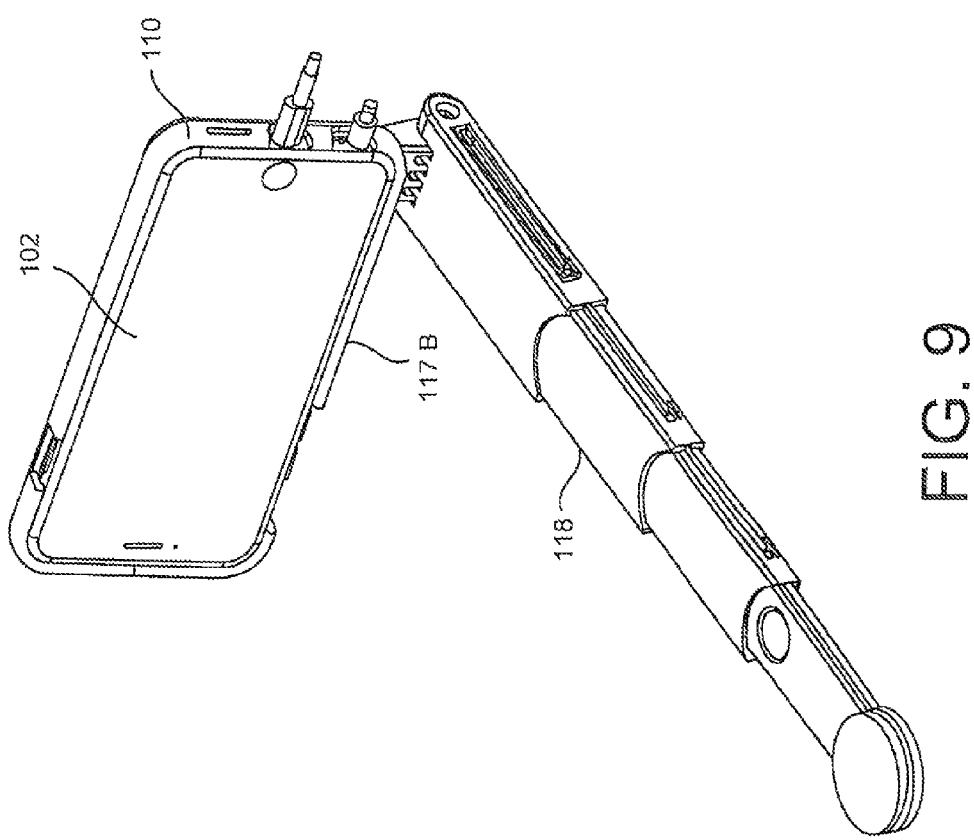
FIG. 9 shows a perspective view with the smart phone tilted to take a landscape image.

Importantly, the arm 120 can not only rotate with respect to case 110 it is articulated so that it can bent to position the case 110 in either position shown in FIGS. 8 and 9. This is accomplished by using a connection to pivotably couple the section 132 to sleeve 130. The connection could be a hinge 138 as shown in FIGS. 5-7. Such a hinge may include formed of interlocking leaves 140, 142 connected by a pin 152. This configuration allows the sleeve 130 (and the sections supported thereon) to pivot with respect to end 122, and therefore case 110.

Preferably the various sections of handle 120 are formed a frictional interference fit there between which allows the sections 134, 136, 138 to slide telescopically in and out of sleeve 130 to any desired length. Thus the handle 118 can take on various the configurations as shown to either store the handle 118 on case 110, or to deploy the handle to the positions such as the ones shown in FIGS. 8 and 9. In these latter positions, the assembly 100 can be gripped by handle 118 and hold the device 102 within the case 110 in a position suitable for taking a "selfie."

More specifically, in FIG. 8, the device 102 is held in a vertical position suitable for a portrait image. In FIG. 9 the device is held in a horizontal position suitable for a landscape image.

Preferably, section 138 is provided with an activation member such as a button 160, an LED indicator light 162 and a battery chamber 166 holding a button-type battery 164. A chamber 168 is provided below the button 160. An IC chip 170 with a microswitch 172 is disposed in the chamber 170. The IC chip 170 is arranged so that the microswitch 172 is selectively operated by button 160. The IC chip also includes a communication module (not shown) that can communicate with the device 102 using any standard protocol such as BlueTooth. Alternatively, the button 160 may be directly wired to the device 102 by a pair of wires (not shown) extending through arm 118. Optionally, an ON-Off switch (not shown) is also provided for activating the IC-chip 170.

The handle is operated as follows. When not in use, the handle 118 is folded into a closed position in which it is adjacent to the case 110 as shown in FIG. 1. IN this position, the IC chip 170 can be Off and the case 110 is used merely as a means of protecting the device 102. When a user desires to take a picture, such as a "selfie", the handle 118 is rotated to an open position of either 90 degrees or 180 degrees. The elements 134, 136, 138 are pulled out of the sleeve 130 until a desired length for the handle 118 is obtained. The elements 130-138 are also pivoted with on hinge 139 to position the device 102 so that it is directed correctly to take a desired image. The IC chip 170 is activated so that it communicates with the device 102. For example, if a Bluetooth protocol is used, the IC chip 170 is paired with the device 102. When pairing is complete, the LED 162 lights up. The LED 162 may also be turned on to show the status of battery 164. The user then pushes button 160 causing the device 102 to "shoot a picture." If direct wiring is used, the activation of the button triggers device 102 in a conventional manner.

Cutouts are provided at various locations on body 112 to provide access to various functions of device 102. For example, device 102 may be connected to a cable 180 for charging it or an audio component (not shown) such as a headphone through a cable 182. Appropriate cutouts are made in the bottom 122 to accommodate these cables 180, 182 (see FIG. 1).

Numerous modifications may be made to this invention without departing from its scope as defined in the appended claims.

I claim:

1. A case for an electronic device such a smart phone having an internal camera for making electronic images, said case comprising:
   a body sized and shaped to form an enclosure for the electronic device, said body including a back wall, said back wall being formed with an external indentation;
   a handle having a first end and a second end; and
   a coupling connecting said handle at said first end with said body said coupling being sized and shape to fold said handle in a first position in which said handle is disposed adjacent to said case and a second position in which the handle extends away from said body to position an electronic device within the enclosure to a picture taking orientation, said coupling being adapted to rotate said housing with respect to said handle in parallel planes;
   wherein said handle is sized and shaped to fit into said indentation in said first position; and
   wherein said handle includes a center portion, a first element a first element first end, said first element first end being attached to said coupling, said handle further including a hinge connecting said first element to said central portion, said hinge being configured to position said central portion at a predetermined angle with respect to said body.

2. The case of claim 1 further comprising a trigger member disposed at said second end and configured to selectively trigger the electronic device to take a picture.

3. The case of claim 1 wherein said handle includes a sleeve and at least one section telescopically extendable from said sleeve to increase the effective length of the handle.

4. The case of claim 1 wherein said back is disposed in a plane and said hinge is configured to selectively pivot said central portion to said angle with respect to said plane.

5. A case for an electronic device, said electronic device being configured to take selected pictures, said case comprising:
 a housing a top a bottom and a back configured to define a cavity selectively receiving the electronic device, said back being formed with an external indentation;
 a handle having a first handle end and a distal end wherein said handle includes a first portion and a second portion connected to said first portion by a hinge, said second portion being selectively rotated to a position at an angle with respect to said back plane;
 a coupling attaching said first handle end to said back with said handle being rotatable with respect to said housing to position the electronic device into a picture taking configuration, said coupling being adapted to position said handle within said indentation when said electronic device is not in said picture taking configuration, wherein said back defines a back plane and said coupling is configured to selectively position said handle to a first position in which the handle is disposed adjacent to said back and a second position by rotating said handle in a plane parallel to said back plane.

6. The case of claim 5 wherein said second portion includes a central portion that is hollow and a plurality of segments telescopically sliding into said central portion.

7. The case of claim 6 wherein one of said segments has an outer end with a trigger element selectively activated to trigger the electronic device.

8. The case of claim 5 wherein said handle includes a distal end and electronic components selectively electronically connected to the electronic device.

9. The case of claim 8 wherein said electronic components include a battery, an IC chip with a communication module selectively establishing wireless communication with the electronic device and a switch activated by the user to activate the electronic device.

10. The device of claim 5 wherein said handle includes a distal end with a trigger element disposed on said distal end, trigger element being configured to selectively activate the electronic device to take a picture.

11. The device of claim 10 wherein said trigger element includes a switch and an integrated circuit communicating with the electronic device, said integrated circuit sending an activation signal to the electronic device when the switch is activated.

12. A case for a device, said device being configured to take selected pictures and having predetermined dimensions, said case comprising:
 a housing defined by a top, a bottom and a back configured to define a cavity having fixed cavity dimensions selected to fit said device, said back being formed with an external indentation;
 a handle sized and shaped to fit into said indentation having a plurality of telescoping sections fitting into each other and forming a first handle end and a distal end;
 a coupling attaching said first handle end to said back with said handle being rotatable with respect to said housing between a first position in which said handle is fully disposed in said cavity and a second position, said second position being selected to orient the device into a picture taking configuration, said coupling is adapted to rotate said housing with respect said handle in parallel planes; and
 a hinge connecting said handle to said coupling and adapted to rotate said housing at an angle with a respect to a plane containing said handle.

13. The case of claim 12 wherein said case has a case length, and a case width and wherein said handle is dimensioned to fit into said indentation in said first position without protruding beyond said case length and case width.

* * * * *